(12) United States Patent
Hara

(10) Patent No.: US 7,628,416 B2
(45) Date of Patent: Dec. 8, 2009

(54) BICYCLE WHEEL SECURING STRUCTURE

(75) Inventor: Nobukatsu Hara, Izumisano (JP)

(73) Assignee: Shimano Inc., Osaka (JP)

( * ) Notice: Subject to any disclaimer, the term of this patent is extended or adjusted under 35 U.S.C. 154(b) by 352 days.

(21) Appl. No.: 11/708,546

(22) Filed: Feb. 21, 2007

(65) Prior Publication Data

US 2008/0197604 A1    Aug. 21, 2008

(51) Int. Cl.
 *B62M 1/02* (2006.01)
(52) U.S. Cl. .................. 280/260; 301/124.2; 301/110.5; 280/279
(58) Field of Classification Search .................. 280/260; 301/124.1, 124.2
See application file for complete search history.

(56) References Cited

U.S. PATENT DOCUMENTS

| | | | |
|---|---|---|---|
| 5,201,242 A * | 4/1993 | Chi ............................. | 74/551.1 |
| 6,089,675 A | 7/2000 | Schlanger | |
| 6,435,622 B1 | 8/2002 | Kanehisa et al. | |
| 2005/0110335 A1 * | 5/2005 | Rose et al. ............... | 301/124.1 |
| 2008/0211296 A1 * | 9/2008 | Takachi .................... | 301/124.2 |

FOREIGN PATENT DOCUMENTS

| | | |
|---|---|---|
| DE | 195 13 764 A1 | 10/1996 |
| EP | 0890505 A1 | 1/1999 |
| EP | 1 566 288 A2 | 8/2005 |
| JP | 07-165149 A | 6/1995 |

* cited by examiner

*Primary Examiner*—Lesley D Morris
*Assistant Examiner*—Tashiana Adams
(74) *Attorney, Agent, or Firm*—Global IP Counselors, LLP

(57) ABSTRACT

A bicycle wheel securing structure includes a shaft member, a head member, a lever member and a radial expansion structure. The shaft member has first and second end portions. The head member is coupled at the second end portion. The lever member is operatively mounted to move the shaft member in an axial direction relative to the head member in response to movement of the lever member. The radial expansion structure is disposed at the second end portion and includes an expansion member and the second end portion of the shaft member. The expansion member has a first inclined surface and the second end portion of the shaft member has a second inclined surface that cooperates with the first inclined surface to radially expand an outer diameter of the radial expansion structure in response to movement of the lever member from a release position to an attachment position.

19 Claims, 11 Drawing Sheets

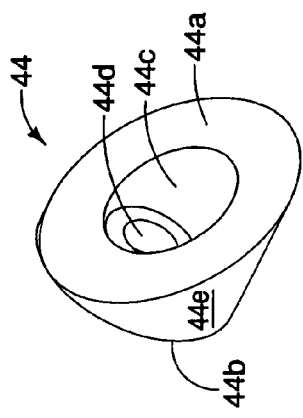
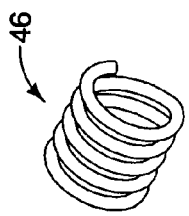
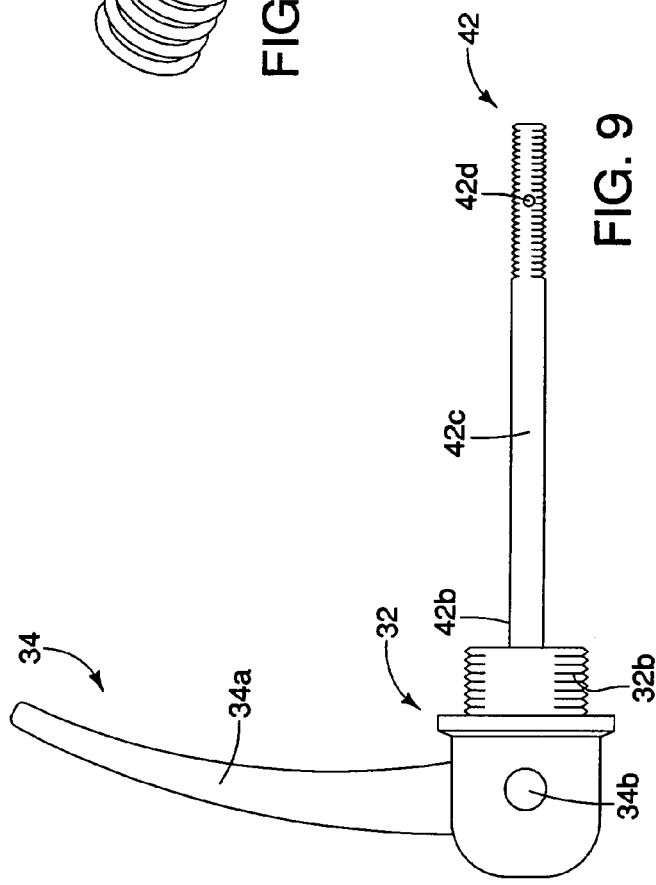
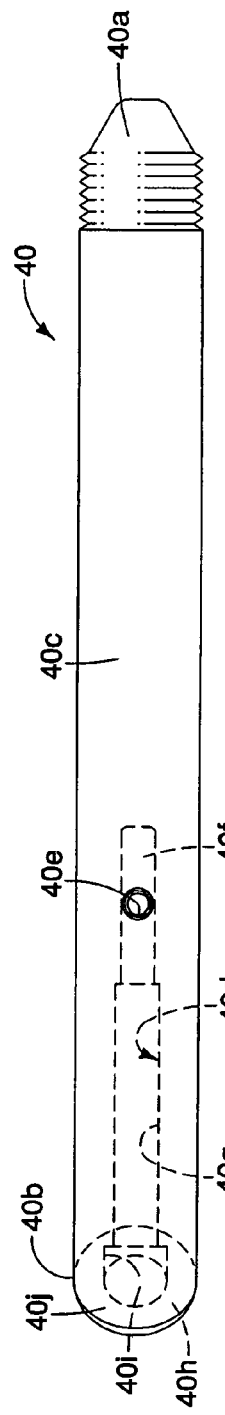
FIG. 11
FIG. 12
FIG. 9
FIG. 10

BICYCLE WHEEL SECURING STRUCTURE

BACKGROUND OF THE INVENTION

1. Field of the Invention

This invention generally relates to a bicycle wheel securing structure. More specifically, the present invention relates to a bicycle wheel securing structure, which provides a radial securing force in addition to an axial securing force.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle wheel securing mechanism.

In the past various bicycle parts have been attached using nut and bolt arrangements. However, while certain bicycle parts are designed to be permanently attached to the bicycle, other bicycle parts such as bicycle wheels need to be loosened and removed relatively often. For example, bicycle wheels need to be removed from the frame whenever there is a flat tire. Moreover, bicycle wheels often need to be removed in order to transport a bicycle in an automobile.

Due to the need to remove and reinstall bicycle wheels, bicycle wheel hubs have been provided with wheel securing mechanisms in order to facilitate easier removal and reinstallation of the wheels. A typical wheel securing device includes a skewer with a threaded end having a nut attached thereto and an opposite end having a wheel securing member mounted thereto. The wheel securing member includes a base with a lever and a cam structure. The nut is detachably threaded onto the threaded end of the skewer after the skewer is inserted through the hub body. One of the fork flanges of the frame is arranged between the base of the wheel securing member and the hub body, while the other of the fork flanges is arranged between the nut and the hub body. Thus, the hub can be attached to the frame relatively easily by clamping the fork flanges using the wheel securing lever and nut. Likewise, the hub can be removed from the frame relatively easily by simply releasing the wheel securing lever. While these typical wheel securing mechanisms generally work well, a tighter connection between the hub and the frame has been in demand for some riders.

Thus, bicycle hubs have been designed having an axle with one threaded end that threadedly attaches directly to the bicycle frame. With this type of hub, a knob is provided on the end of the hub axle opposite the threaded end. The knob is used to rotate the axle during installation to both tighten the axle to the frame and to clamp one fork flange between the knob and the hub. With this type of hub, a tighter connection between the hub and the frame is possible as compared to typical wheel securing hubs. However, it can be difficult for some individuals to tighten such a knob. Specifically, with this type of hub, the tightness of the connection between the hub and the frame at least partially depends on the individual installing the hub (i.e., the strength of the individual). In fact, individuals that have difficulty tightening the knob to the desired tightness level may even use a tool in order to achieve the desired level of tightness, which is inconvenient.

In view of the above, it will be apparent to those skilled in the art from this disclosure that there exists a need for an improved bicycle wheel securing structure. This invention addresses this need in the art as well as other needs, which will become apparent to those skilled in the art from this disclosure.

SUMMARY OF THE INVENTION

One object of the present invention is to provide a bicycle wheel securing structure, which provides a tight connection, yet is relatively easy to tighten.

Another object of the present invention is to provide a bicycle wheel securing structure, which is relatively simple and inexpensive to manufacture and/or assemble.

The foregoing objects can basically be attained by providing a bicycle wheel securing structure, which comprises a shaft member, a head member, a lever member and a radial expansion structure. The shaft member has a first end portion and a second end portion with a longitudinal center axis extending therebetween. The head member is coupled to the shaft member at the second end portion of the shaft member. The lever member is operatively mounted between the shaft member and the head member to move the shaft member in an axial direction relative to the head member in response to movement of the lever member. The radial expansion structure is disposed at the second end portion of the shaft member. The radial expansion structure includes an expansion member and the second end portion of the shaft member, the expansion member having a first inclined surface and the second end portion of the shaft member having a second inclined surface that cooperates with the first inclined surface of the expansion member to radially expand an outer diameter of the radial expansion structure in response to movement of the lever member from a release position to an attachment position. The first and second inclined surfaces are inclined relative to the longitudinal center axis.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 9 is a longitudinal elevational view of the inner axle of the wheel securing axle illustrated in FIGS. 2-8;

FIG. 10 is a longitudinal elevational view of the outer axle of the wheel securing axle illustrated in FIGS. 2-8;

FIG. 11 is an enlarged perspective view of the expansion member of the wheel securing axle illustrated in FIGS. 2-8;

FIG. 12 is a perspective view of the biasing spring of the outer axle of the wheel securing axle illustrated in FIGS. 2-8;

DETAILED DESCRIPTION OF THE PREFERRED EMBODIMENTS

A selected embodiment of the present invention will now be explained with reference to the drawings. It will be apparent to those skilled in the art from this disclosure that the following descriptions of the embodiment of the present invention are provided for illustration only and not for the purpose of limiting the invention as defined by the appended claims and their equivalents.

Figure 1:
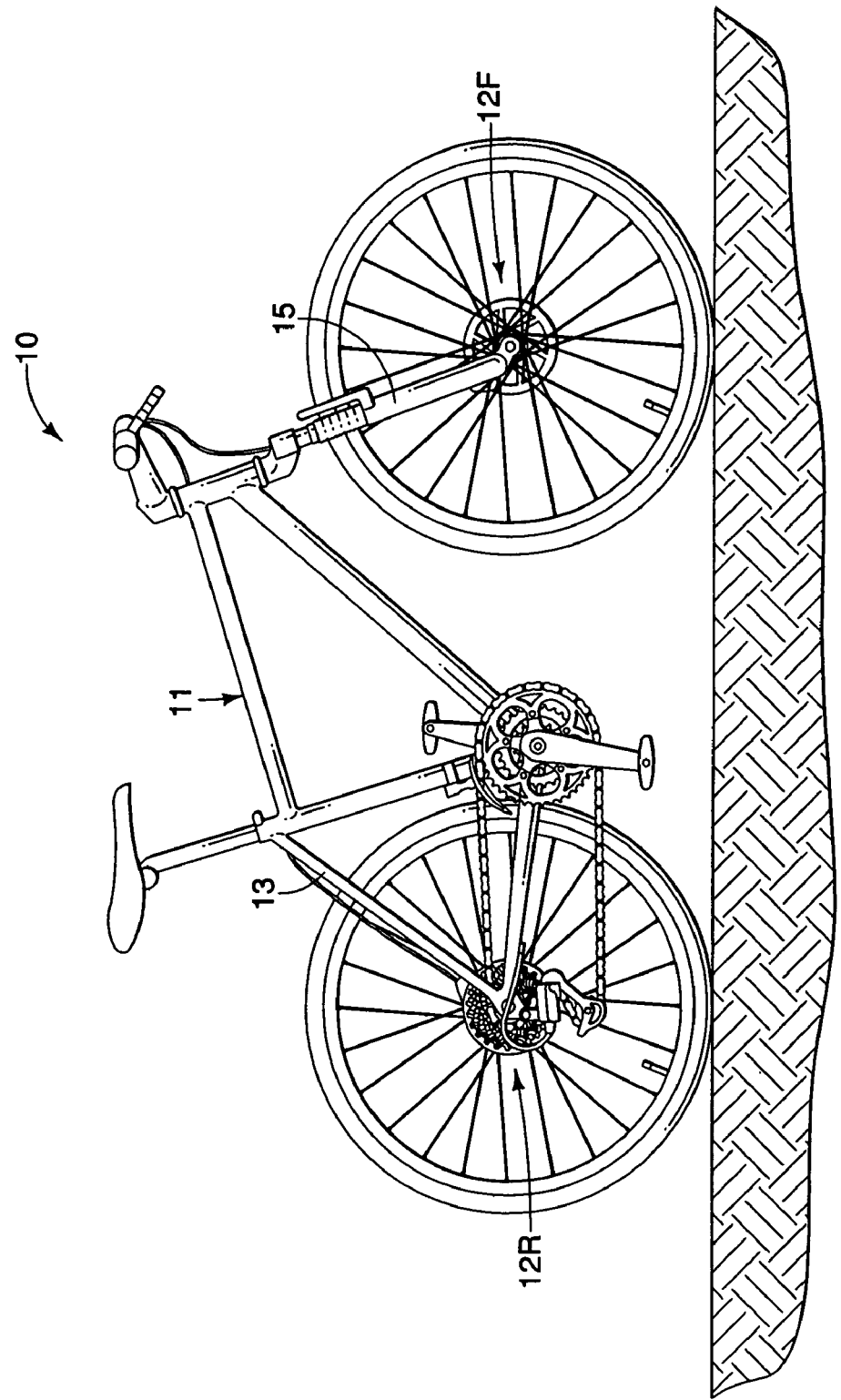
FIG. 1 is a side elevational view of a bicycle with a rear bicycle hub coupled thereto in accordance with one embodiment of the present invention.
Figure 2:
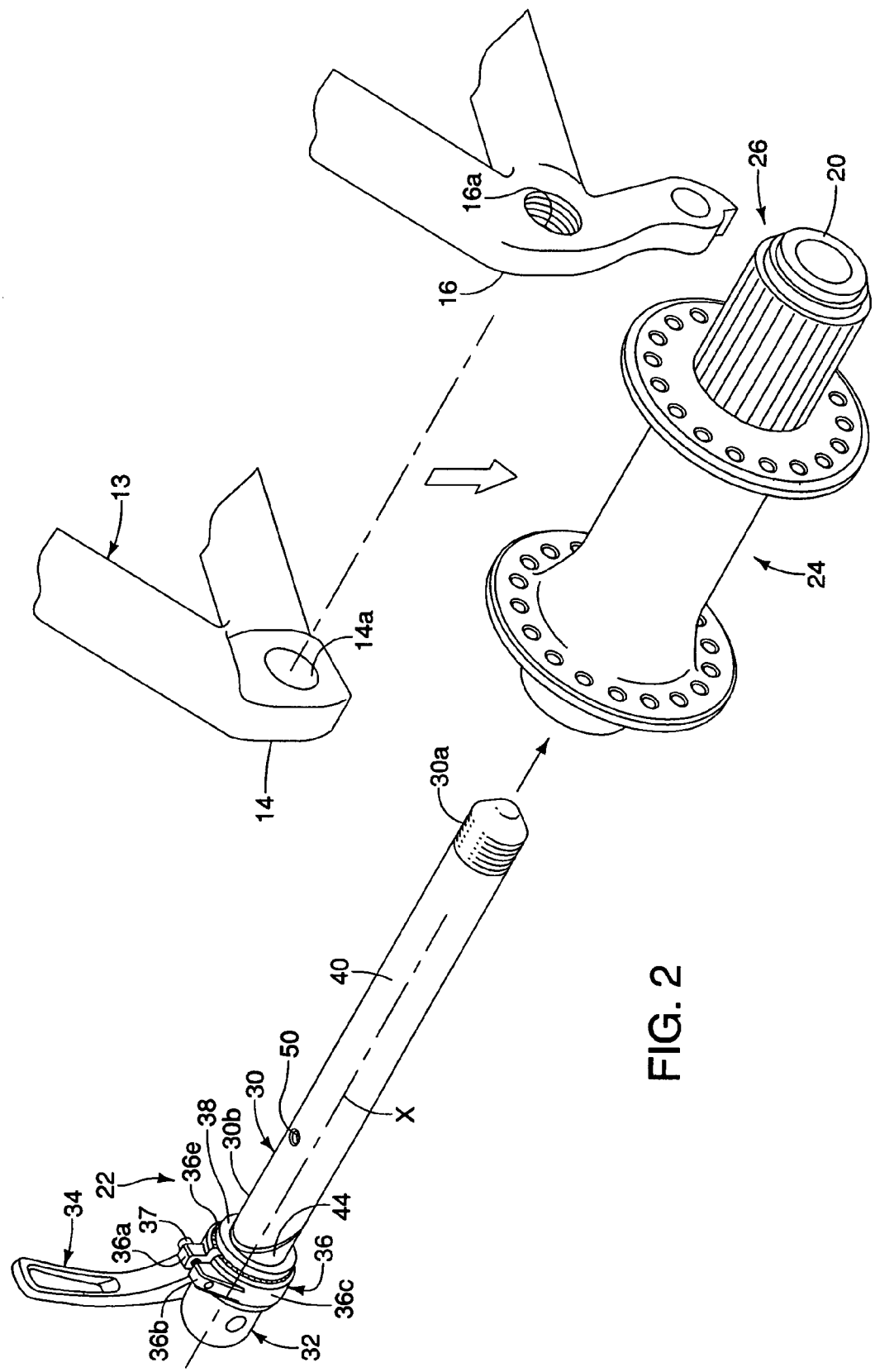
FIG. 2 is an enlarged, exploded perspective view of a portion of the frame and the rear hub illustrated in FIG. 1.

Referring initially to FIG. 1, a bicycle 10 is illustrated, which has a rear bicycle hub 12R and a front bicycle hub 12F coupled thereto in accordance with one preferred embodiment of the present invention. The rear hub 12R is attached the frame 11 of the bicycle 10 using a wheel securing axle 22 in accordance with the present invention. Specifically, the frame 11 includes a rear fork or triangle 13 with a pair of hub mounting flanges 14 and 16 formed at the free ends thereof. Preferably, one end of the wheel securing axle 22 is directly threadedly attached to the mounting flange 16, while the other end has a wheel securing mechanism that is used to securely attach the wheel securing axle 22 to the other mounting flange 14. The front hub 12F is attached the frame 11 of the bicycle 10 using a wheel securing axle 22' in accordance with the present invention in a manner substantially identical to the rear hub 12R, as explained below.

The bicycle 10 is conventional, except for the rear hub 12R having the wheel securing axle 22 and the front hub 12F having the wheel securing axle 22'. Accordingly, the bicycle 10 and its various components will not be discussed and/or illustrated in detail herein, except as related to the rear hub 12R having the wheel securing axle 22 the front hub 12F having the wheel securing axle 22' of the present invention. Moreover, it will be apparent to those skilled in the bicycle art from this disclosure that various modifications can be made to the bicycle 10 and its components without departing from the present invention. The rear hub 12R will be explained first.

Referring to FIGS. 2-8, the rear bicycle hub 12R includes a main hub axle 20, the wheel securing axle 22, a hub assembly 24 and a freewheel 26. The rear hub 12R is conventional, except for the wheel securing axle 22. Accordingly, the rear hub 12R will not be discussed and/or illustrated in detail herein, except as related to the wheel securing axle 22 of the present invention. A hub shell (outline shown in broken lines) of the hub assembly 24 and the free wheel 26 are rotatably supported on the main hub axle 20 of the rear hub 12R via a bearing assembly and/or other conventional parts in a conventional manner. The wheel securing axle 22 extends through the main hub axle 20. Thus, forward rotation of rear sprockets mounted on the free wheel 26 transmits torque to the hub assembly 24. The hub assembly 24 is coupled to the rear rim via a plurality of spokes in a conventional manner to transmit the forward rotation of the hub assembly 24 to the rear rim (tire).

Referring to FIGS. 2-15, the bicycle wheel securing axle 22 basically includes a shaft member 30, a head member 32, a lever member 34, an adjustment member 36 and a washer 38. The shaft member 30 is constructed is several parts. When assembled, the shaft member 30 has a first threaded end portion 30a and a second end portion 30b with a longitudinal center axis X extending between the first and second end portions 30a and 30b, as seen in FIGS. 2-5. A direction parallel to the longitudinal center axis X will be considered an axial/longitudinal direction, while a direction perpendicular to the longitudinal center axis X will be considered a transverse direction.

The first threaded end portion 30a is designed to be directly threadedly attached to the mounting flange 16. The head member 32 is coupled to the second end portion 30b such that the second end portion 30b supports the head member 32. The lever member 34 is operatively mounted between the shaft member 30 and the head member 32 to move the shaft member 30 in an axial direction relative to the head member 32 in response to movement of the lever member 34. The adjustment member 36 is axially adjustably coupled to the head member 32 such that an axial position of the adjustment member 36 can be adjusted relative to the shaft member 30 and the head member 32, as explained below in more detail. The washer 38 is disposed on the shaft member 30 adjacent the adjustment member 36, as explained below.

The shaft member 30 basically includes an outer axle 40, an inner axle 42, an expansion member 44 and a biasing member 46. The inner axle 42 is releasably attached within the outer axle 40 in an installed position, as seen in FIGS. 4 and 6-8. The outer axle 40 and the inner axle 42 are preferably releasably attached together via a threaded connection to releasably prevent axial removal of the inner axle 42 from the outer axle 40 when the inner axle 42 is in the installed position. The expansion member 44 is slidably disposed on the inner axle 42 adjacent one end of the outer axle 40. The biasing member 46 is axially disposed between the outer axle 40 and the expansion member 44 to bias these parts out of engagement with each other.

Referring to FIGS. 2-4, 6-8 and 10, the outer axle 40 basically includes a first externally threaded axial end 40a, a second axial end 40b, an outer rod portion 40c, an internal bore 40d and a transverse threaded bore 40e. The threaded axial end 40a forms the first end portion 30a of the shaft member 30 when the shaft member 30 is fully assembled. Thus, the threaded axial end 40a is preferably directly threadedly attached to the mounting flange 16. The second axial end 40b is attached to the mounting flange 14. The second axial end 40b together with part(s) of the inner axle 42, the expansion member 44 and the biasing member 46 constitute parts of the second end portion 30b of the shaft member 30 when the shaft member 30 is fully assembled. The outer axle 40 preferably has a circular external shape, as viewed along the center axis X, as best understood from FIG. 3. The outer axle 40 is preferably constructed of a lightweight rigid material such as a metallic material utilizing conventional manufacturing techniques such as casting and/or machining. In this embodiment, the outer axle 40 is preferably constructed as a one-piece, unitary member.

Figure 7:
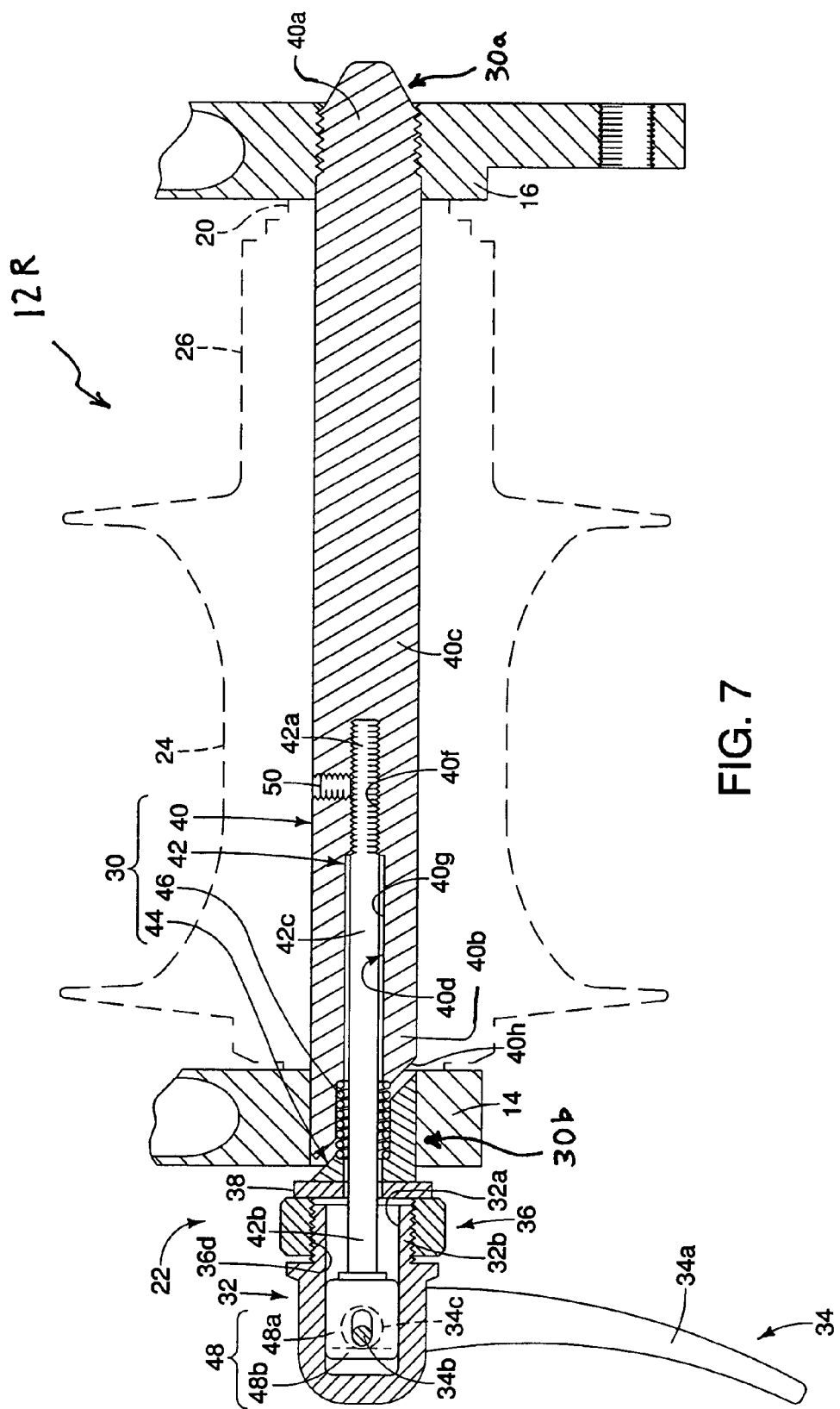
FIG. 7 is an enlarged, partial cross-sectional view of a portion of the frame and the rear hub illustrated in FIGS. 1-2, with the wheel securing axle in a third, partially installed position (i.e. after rotation as illustrated in FIGS. 5 and 6) but prior to clamping the frame using the wheel securing lever.
Figure 8:
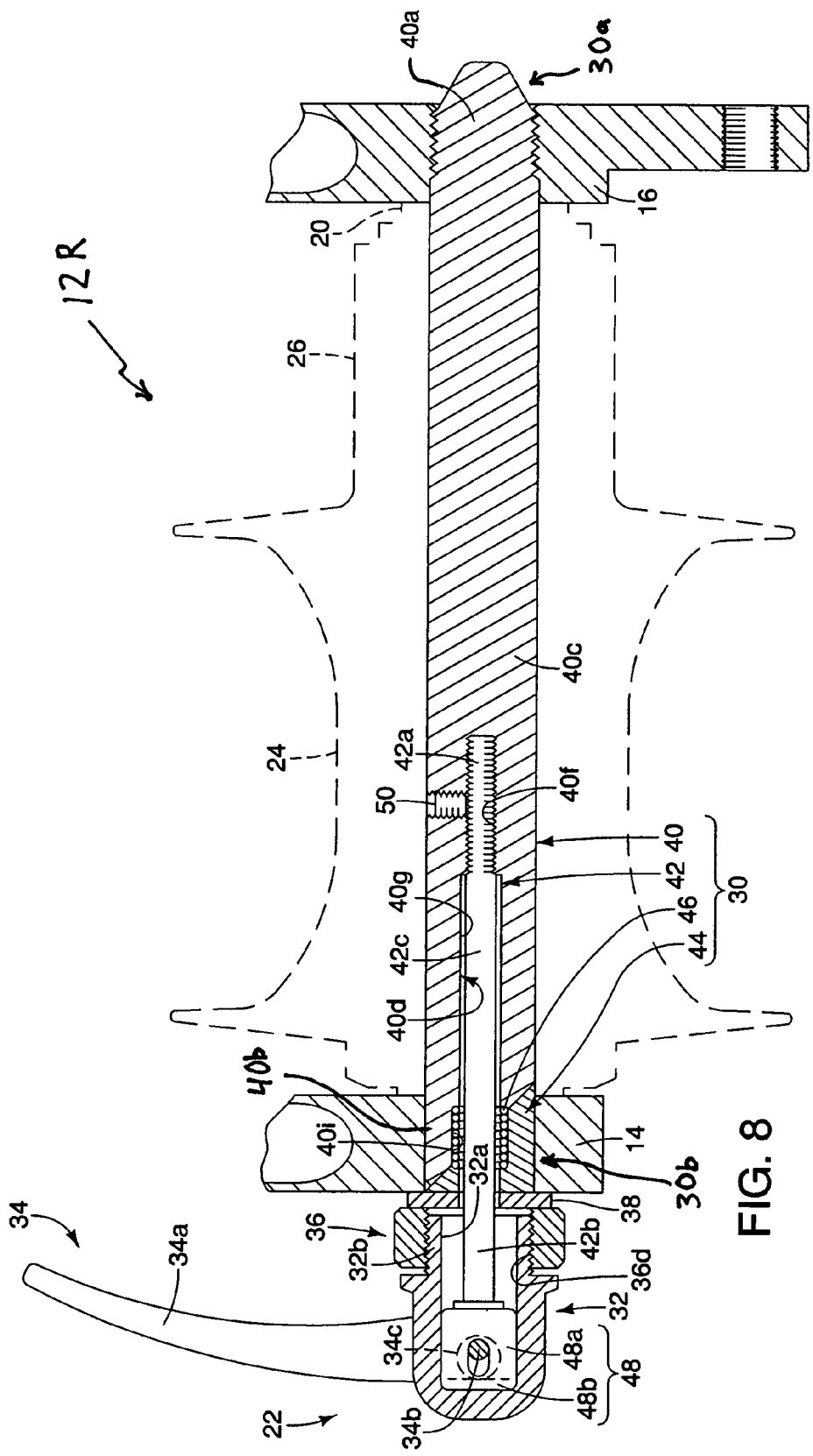
FIG. 8 is an enlarged, partial cross-sectional view of a portion of the frame and the rear hub illustrated in FIGS. 1-2, with the wheel securing axle in a fully installed position after clamping the frame using the wheel securing lever.
Figure 15:
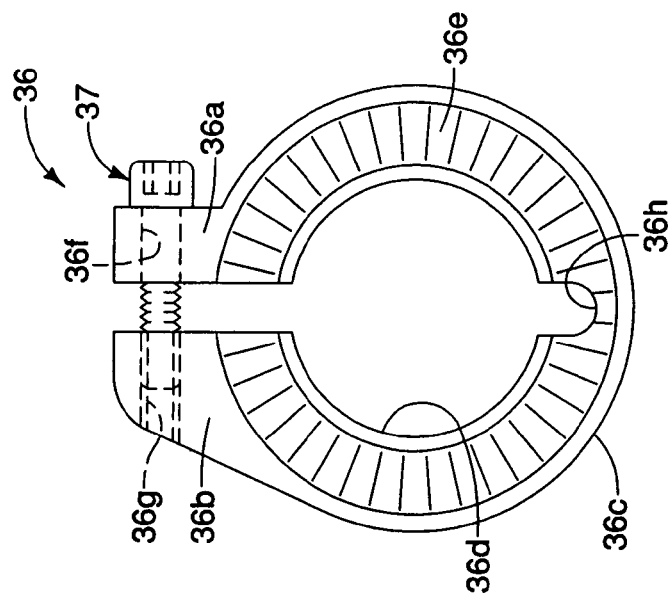
FIG. 15 is an inner end elevational view of the adjustment member illustrated in FIGS. 13 and 14.
Figure 14:
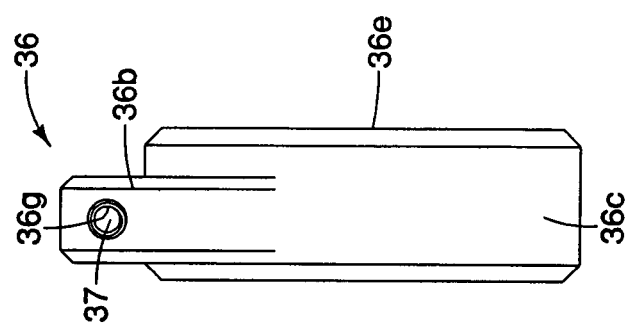
FIG. 14 is a side elevational view of the adjustment member illustrated in FIG. 13.

The mounting flange 16 has a threaded bore 16a that is preferably a closed bore with a continuous annular female threads (i.e., preferably not a slot), which receives the first axial threaded end 40a. In this embodiment, the threaded bore 16a has an unthreaded section that receives an unthreaded part of the outer axle 40 therein. The mounting flange 14 has an unthreaded bore 14a that is preferably a closed bore with a continuous annular surface (i.e., preferably not a slot), which receives the second axial end 40b. The outer axle 40 of the shaft member 30 is preferably dimensioned and tightened to the mounting flange 16 such that a free edge of the second axial end 40b of the outer axle 40 adjacent the head member 32 does not project beyond an outer axially facing surface of the mounting flange 14, as seen in FIGS. 7 and 8.

Of course, it will be apparent to those skilled in the art from this disclosure that the bore 16a could be completely threaded and additional threads could be provided on the threaded axial end 40a, but still resulting in the position of the second axial end 40b when the outer axle 40 is fully threaded into the bore 16a, if needed and/or desired. Moreover, it will be apparent to those skilled in the art from this disclosure that the preceding arrangement could be further modified with even longer threads at the threaded axial end 40a being provided such that the position of the second axial end 40b is more adjustable relative to the flange 14 and/or such that the wheel securing axle can be used with the mounting flanges of varying thicknesses/spacings, if needed and/or desired. In any case, the threaded axial end 40a, the threaded bore 16a, the spacing/thickness of the mounting flanges 14 and 16 as well as the overall length of the outer axle 40 are preferably dimensioned such that the free edge of the second axial end 40b will not project out of the mounting hole 14a.

The outer rod portion 40c extends between the first and second axial ends 40a and 40b, and preferably has an external surface with a substantially uniform, circular shape. However, it will be apparent to those skilled in the bicycle art from this disclosure that the external surface of the outer rod portion 40c could have other configurations as needed and/or desired.

In this embodiment, the internal bore 40d is a stepped, blind bore with a threaded section 40f arranged at the first threaded axial end 40a of the outer axle 40 and an enlarged unthreaded section 40g extending from the threaded section 40f to an open end at the second axial end 40b. The inner axle 42 is threadedly attached to the threaded section 40f of the internal bore 40d. The inner axle 42 extends out of the unthreaded section 40g of the internal bore 40d. Thus, the inner axle 42 extends from the second axial end 40b of the outer axle 40 when the inner axle 42 is in the installed position. The head member 32 is preferably attached to an end of the inner axle 42 extending out of the internal bore 40d, as explained below. The stepped internal bore 40d preferably has a circular internal shape, as viewed along the center axis X.

A set screw 50 is preferably threadedly mounted in the transverse threaded bore 40e to releasably prevent relative rotation of the inner axle 42 within the internal bore 40d when the inner axle 42 is in the installed position, as explained below. Thus, the set screw 50 is preferably disposed between the outer axle 40 and the inner axle 42 to releasably prevent relative rotation of the inner axle 42 within the internal bore 40d when the inner axle 42 is in the installed position. The transverse threaded bore 40e extends between an external surface of the outer axle 40 and the internal bore 40d.

The second axial end 40b has an inclined (second end) surface 40h and a (second) spring receiving recess 40i extending axially from the inclined surface 40h. The biasing member 46 is preferably a coiled compression spring with one end received in the recess 40i. The recess 40i preferably has a larger diameter than the unthreaded section 40g of the blind bore 40d such that the inner axle 42 is slidably received through the biasing member 46. The inclined surface 40h cooperates with the expansion member 44 to provide a radial securing force at the second end portion 30b, as explained below.

Referring to FIGS. 2-4 and 6-9, the inner axle 42 basically includes a first threaded end 42a, a second end 42b, an inner rod portion 42c and a bracket 48. The first threaded end 42a is threadedly attached to the threaded section 40f of the internal bore 40d. The first threaded end 42a and the threaded section 40f constitute parts of a threaded connection between the outer and inner axles 40 and 42 when coupled together. The a second end 42b extends out of the unthreaded section 40g of the internal bore 40d. The second end 42b supports the head member 32 and the lever member 34. Specifically, the second end 42b of the inner axle 42 has the bracket 48 attached thereto, which supports the head member 32 and the lever member 34. The inner rod portion 42c extends between the first and second ends 42b and 42c.

The inner axle 42 preferably has a circular shape as viewed along the center axis X, except for the bracket 48 arranged on the second end 42b. The second end 42b extends out of the internal bore 40d, as best understood from FIGS. 3, 4 and 6. The inner axle 42 is preferably constructed of a lightweight rigid material such as a metallic material utilizing conventional manufacturing techniques such as casting and/or machining. In this embodiment, the inner axle 42 can constructed as a one-piece, unitary member together with the bracket 48, or the bracket 48 can be constructed as a separate member that is fixed to the inner axle 42 (e.g. by welding or the like).

The bracket 48 preferably includes a support portion 48a with a longitudinal slot, and a cam portion 48b in an L-shaped configuration. The support portion 48a with the slot receives part of the lever member 34 therethrough, as explained below. The cam portion 48b that has a cam surface that cooperates with a cam surface of the lever member 34 to move the inner axle 42 of the shaft member 30 in an axial direction relative to the head member 32 in response to movement of the lever member 34 from a release position shown in FIG. 7 to fixing position shown in FIG. 8. The bracket 48 is relatively conventional, and thus, will not be explained and/or illustrated in further detail herein.

Referring to FIGS. 2-4, 6-8 and 11, the expansion member 44 basically includes an inclined (first end) surface 44a, a second axial end surface 44b, a (first) spring receiving recess 44c and an axle receiving hole 44d. The spring receiving recess 44c extends axially from the inclined surface 44a, while the axle receiving hole 44d extends axially from the second axial end surface 44b to the spring receiving recess 44c. The axle receiving hole 44d is slightly larger than the inner rod section 42c. The inclined surface 44a has an inclination identical to the inclined surface 40h, e.g. about forty-five degrees. The expansion member 44 is preferably constructed of a lightweight rigid material such as a metallic material utilizing conventional manufacturing techniques such as casting and/or machining. In this embodiment, the expansion member 44 is constructed as a one-piece, unitary member.

The expansion member 44 and the second axial end 40b of the outer axle 40 constitute parts of a radial expansion structure with an outer diameter defined by an outer surface 44e of the expansion member 44 and an outer surface 40j of the second axial end 40b. The inclined surfaces 40h and 44a cooperate with each other to radially expand the outer diameter of the radial expansion structure in response to relative axial movement of the expansion member 44 toward the threaded axial end 40a, which is occurs in response to movement of the lever member 34 from a release position to an attachment position, as explained below. Relative axial movement between the expansion member 44 and the second axial end 40b causes at least one of the outer surfaces 44e and 40j to move radially outwardly to expand the outer diameter of the radial expansion structure. The biasing member 46 normally biases the inclined surfaces 40h and 44a axially away from (out of contact with) each other so that the radial expansion structure is normally biased toward a non-expanded state.

The set screw 50 is arranged to selectively contact an external surface of the inner axle 42 when the set screw 50 is tightened, as shown in FIGS. 4 and 6-8. Specifically, the set screw 50 is threadedly (adjustably) mounted in the transverse threaded bore 40e, as mentioned above. Thus, the end of the set screw 50 frictionally prevents rotation of the inner axle 42 relative to the outer axle 40 when tightened against the external surface of the inner axle 42. Optionally, the external surface of the inner axle 42 may include a recess or dented area 42d, such as that illustrated in FIG. 9. With such an arrangement, the inner axle 42 can further be prevented from rotating relative to the outer axle 40 when the internal end of the set screw 50 is received in the dented area 42d.

Referring to FIGS. 2-8, the lever member 34 basically includes an operating lever portion 34a, a pivot pin portion 34b and a cam portion 34c. The cam portion 34c rotates with the operating lever portion 34a and contacts a cam surface of the cam portion 48b of the bracket 48. The cam surface of the cam portion 34c cooperates with the cam surface of the cam portion 48b during rotation of the operating lever portion 34a to move the head member 32 axially closer to the threaded end portion 30a when the operating lever portion 34a is rotated from the release position to the fixing position, as seen in FIGS. 7 and 8, respectively. The pivot pin portion 34b is rotatably supported by the head member 32 in one or more holes in a conventional manner. The pivot pin portion 34b is also rotatably supported and longitudinally slidably supported by the support portion 48a of the bracket 48. Specifically, the pivot pin portion 34b is disposed within the slot of the support portion 48a. The lever member 34 is relatively conventional, and thus, will not be discussed and or illustrated in further detail herein.

Referring still to FIGS. 2-8, the head member 32 is basically a cup-shaped member having an internal recess 32a and a threaded section 32b. The bracket 48 of the inner axle 42 is received in the recess 32a. Also, the cam portion 34c is received in the recess 32b. The pivot pin portion 34b, extending from the operating lever portion 34a, extends in a transverse direction through the head member 32 and through the support portion 48a of the bracket 48, which is disposed within the recess 32a. The lever member 34 is preferably spaced axially outwardly from the threaded section 32b along the center axis X.

The threaded section 32b preferably has a tubular configuration with external (male) threads. The adjustment member 36 is threaded onto the externally threaded section 32b. Thus, the adjustment member 36 constitutes an adjustable part of the head member 32 when attached thereto, while the washer 38 constitutes a removable abutment part of the head member 32. Preferably, the externally threaded section 32b has an axial length that is the same as or slightly smaller than an axial length of the adjustment member 36 so that the adjustment member 36 will contact the mounting flange 14 in a fully assembled state, as shown in FIG. 8. In other words, the threaded section 32b alone does not contact the mounting flange 14.

Referring now to FIGS. 2-8 and 13-15, the adjustment member 36 will now be explained in more detail. The adjustment member 36 is threadedly mounted on the externally threaded section 32b, as mentioned above. Thus, the adjustment member 36 is axially adjustably coupled to the head member 32 by rotating the adjustment member 36 relative to the head member 32. The adjustment member 36 basically has a split ring or C-shaped configuration. The adjustment member 36 basically includes a first free end 36a, a second free end 36b, a curved connecting portion 36c with an internal (female) threaded bore 36d, an axially facing abutment surface 36e, and a tightening element 37. The threaded bore 36d extends axially through the adjustment member 36. The axially facing abutment surface 36e is formed on an end of the adjustment member facing the threaded end portion 30a. The tightening element 37 is preferably coupled between the first and second ends 36a and 36b to selectively prevent rotation of the adjustment member 36, as explained below.

The adjustment member 36 is preferably constructed of a lightweight rigid material such as a metallic material utilizing conventional manufacturing techniques such as casting and/or machining. The first end 36a, the second end 36b and the connecting portion 36c of the adjustment member 36 are preferably integrally formed together as a one-piece, unitary member. The tightening element 37 is preferably formed as a separate member from the first end 36a, the second end 36b and the connecting portion 36c of the adjustment member 36.

Figure 13:
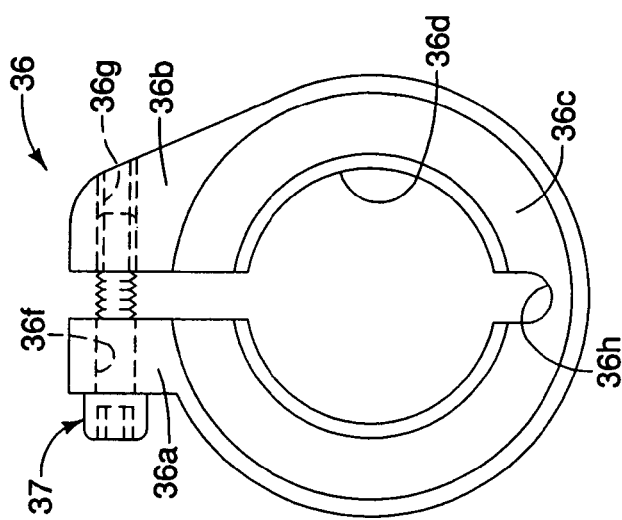
FIG. 13 is a further enlarged, outer end elevational view of the adjustment member of the wheel securing axle illustrated in FIGS. 2-8.

The first end 36a of the adjustment member 36 preferably has an unthreaded through bore 36f that is aligned with a threaded bore 36g of the second end 36b, as best seen in FIGS. 11-13. The tightening element 37 is preferably a threaded bolt or screw with a threaded shaft an enlarged head. The shaft of the tightening element 37 extends through the through bore 36f and into the threaded bore 36g to adjustably attach the first and second free ends 36a and 36b together. The head of the tightening element 37 contacts the first free end 36a of the adjustment member 36.

When the tightening element 37 is tightened (rotated to extend further into the threaded bore 36g), the internal diameter of the threaded bore 36d is reduced. On the other hand, when the tightening element 37 is loosened (rotated in the opposite direction to extend less into the threaded bore 36g), the internal diameter of the threaded bore 36d is increased. The threaded internal bore 36d preferably includes an axially extending notch 36h formed therein to facilitate tightening of the tightening element 37 to reduce the internal diameter of the threaded internal bore 36d.

If the internal diameter of the threaded bore 36d is reduced a predetermined amount by the tightening element 37, friction between the threaded bore 36d and the external threaded section 32b of the head member 32 prevents rotation of the adjustment member 36 relative to the head member 32. On the other hand, if the internal diameter of the threaded bore 36d is increased a predetermined amount by the tightening element 37, friction between the threaded bore 36d and the external threaded section 32b of the head member 32 is negligible such that free rotation of the adjustment member 36 relative to the head member 32 is permitted. In other words, varying degrees of frictional engagement between the adjustment member 36 and the head member 32 can be provided depending on how tight the tightening element 37 is (i.e., how much the tightening element 37 is rotated). Preferably, once the adjustment member 36 is located in the desired position on the head member 32 (i.e., relative to the mounting flange 14), the tightening element 37 is tightened enough to prevent rotation of the adjustment member 36 relative to the head member 32.

Because the axial position of the adjustment member 36 relative to the head member 32 is adjustable, the axial position of the abutment surface 36e of the adjustment member 36 can be adjusted relative to the head member 32. Thus, the axial position of the abutment surface 36e can be adjusted relative to the shaft member 30. The abutment surface 36e is preferably a textured surface configured to frictionally engage the washer 38. The configuration of the textured axially facing abutment surface 36e is illustrated as a plurality of radially extending ridges/valleys. However, it will be apparent to those skilled in the bicycle art from this disclosure that the abutment surface 36e can have other configurations as needed and/or desired.

The washer 38 has a smaller hole than the threaded bore 36d the adjustment member 36, and an outer diameter about the same size or slightly smaller than the adjustment member 36. Thus, the washer 38 will preferably contact the second axial end surface 44b of the expansion member 44 and the mounting flange 14 when the wheel securing axle 22 is fully assembled and completely attached to the rear fork 13. Specifically, when the shaft member 30 is fully assembled, and the lever member 34 is moved from the release position (FIG. 7) to the fixing position (FIG. 8), a substantially annular abutment surface of the washer 38 will preferably contact the second axial end surface 44b of the expansion member 44 and the mounting flange 14 to provide a radial securing force as well as an axial securing force, respectively. In other words, the washer 38 projects radially outwardly of the expansion member 44 and the second axial end 40b.

Referring now to FIGS. 2-15, assembly and use of the rear hub 12R having the wheel securing axle 22 in accordance with the present invention will now be explained in more detail. Prior to mounting the rear hub 12R having the wheel securing axle 22 to the mounting flanges 14 and 16, the main hub axle 20, the hub assembly 24 and the free wheel 26 are assembled together as a unit in a conventional manner. The wheel securing axle 22 is assembled as a separate unit from the unit including the main hub axle 20, the hub assembly 24 and the free wheel 26 in accordance with the present invention.

Figure 3:
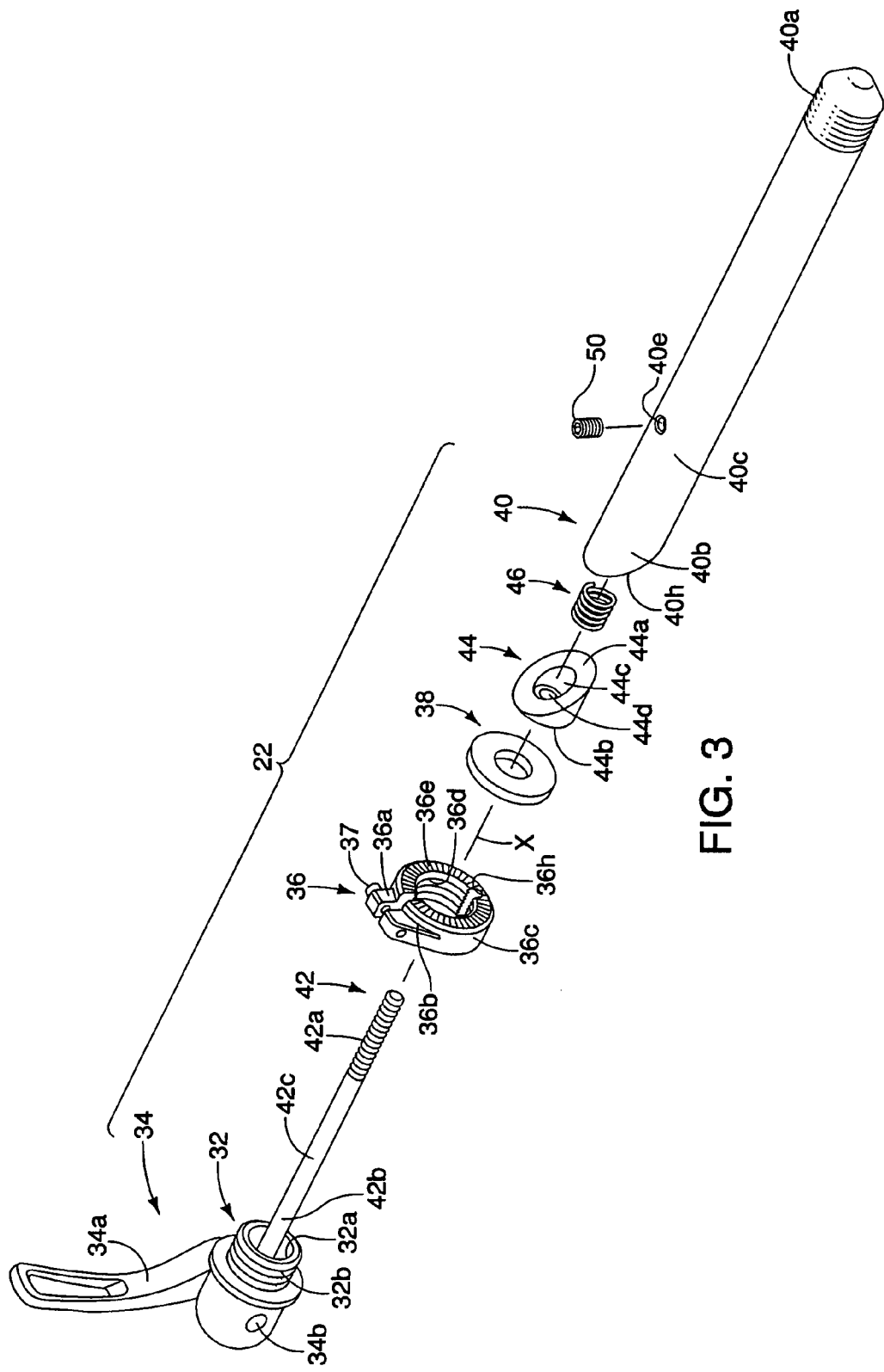
FIG. 3 is an exploded, perspective view of the wheel securing axle of the rear hub illustrated in FIG. 2.
Figure 4:
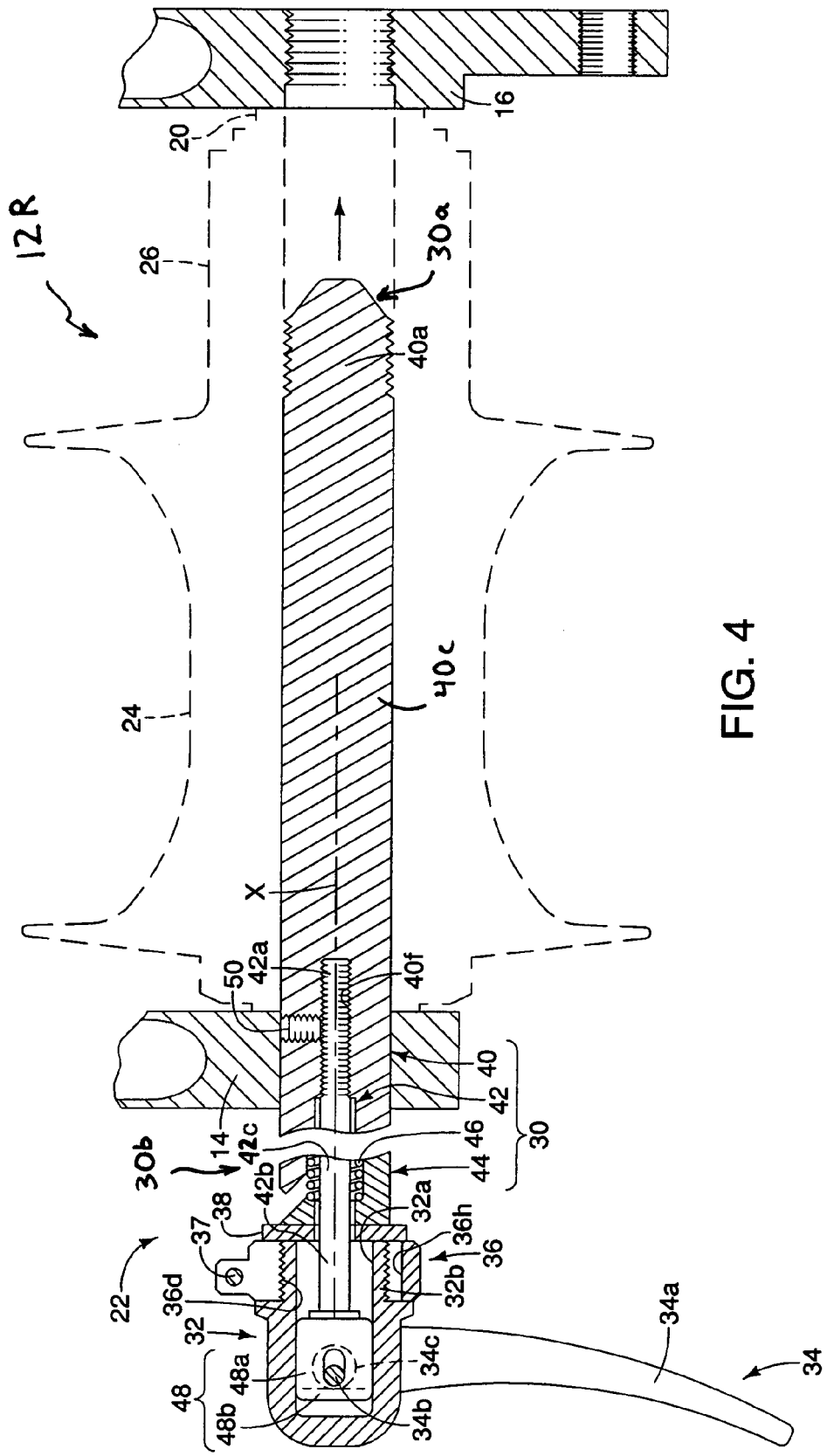
FIG. 4 is an enlarged, partial cross-sectional view of a portion of the frame and the rear hub illustrated in FIGS. 1-2, with the wheel securing axle in a first, partially installed position.
Figure 5:
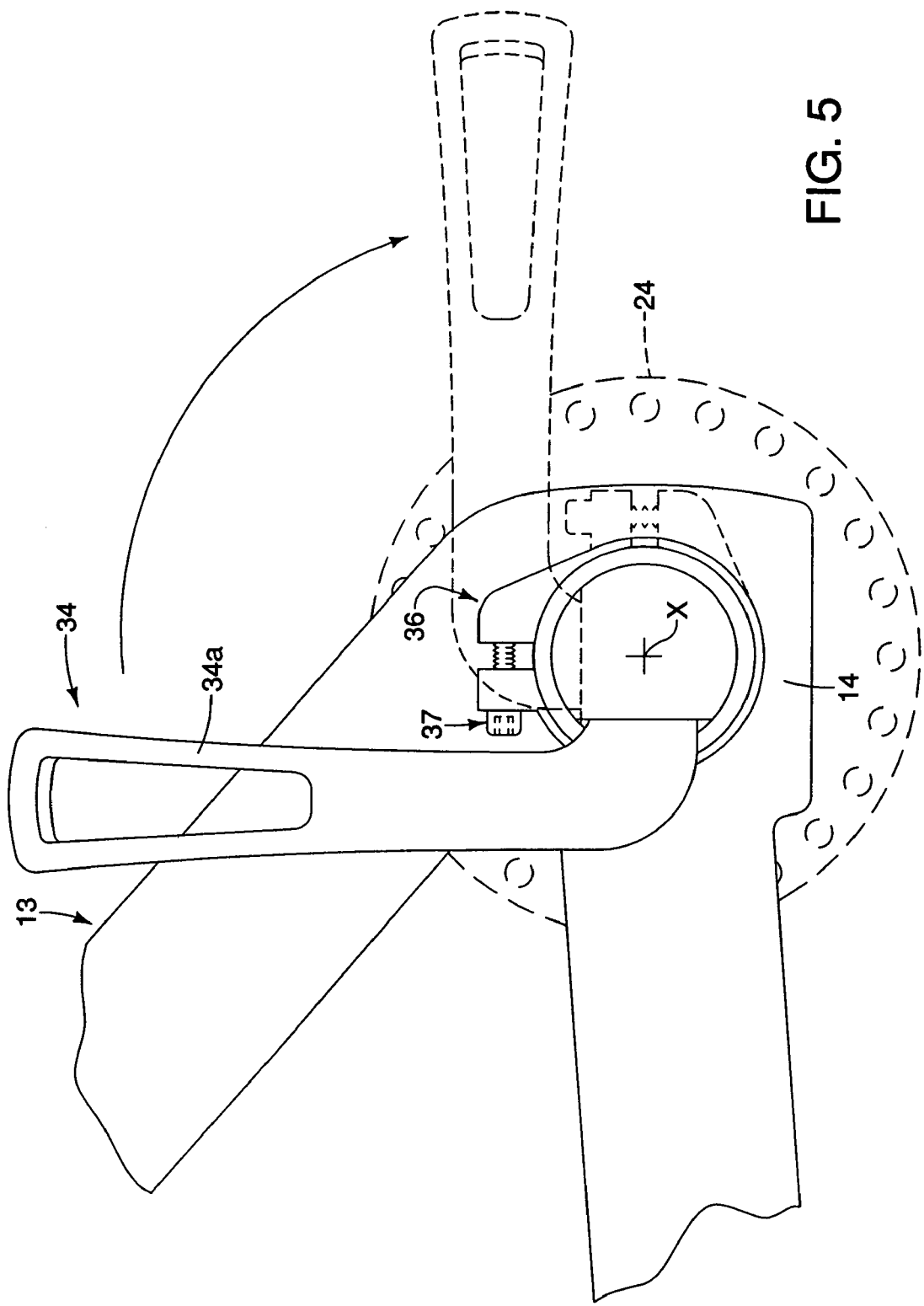
FIG. 5 is an enlarged, end elevational view of the portion of the frame and the rear hub illustrated in FIG. 4, illustrating rotation of the wheel securing axle from the first, partially installed position.
Figure 6:
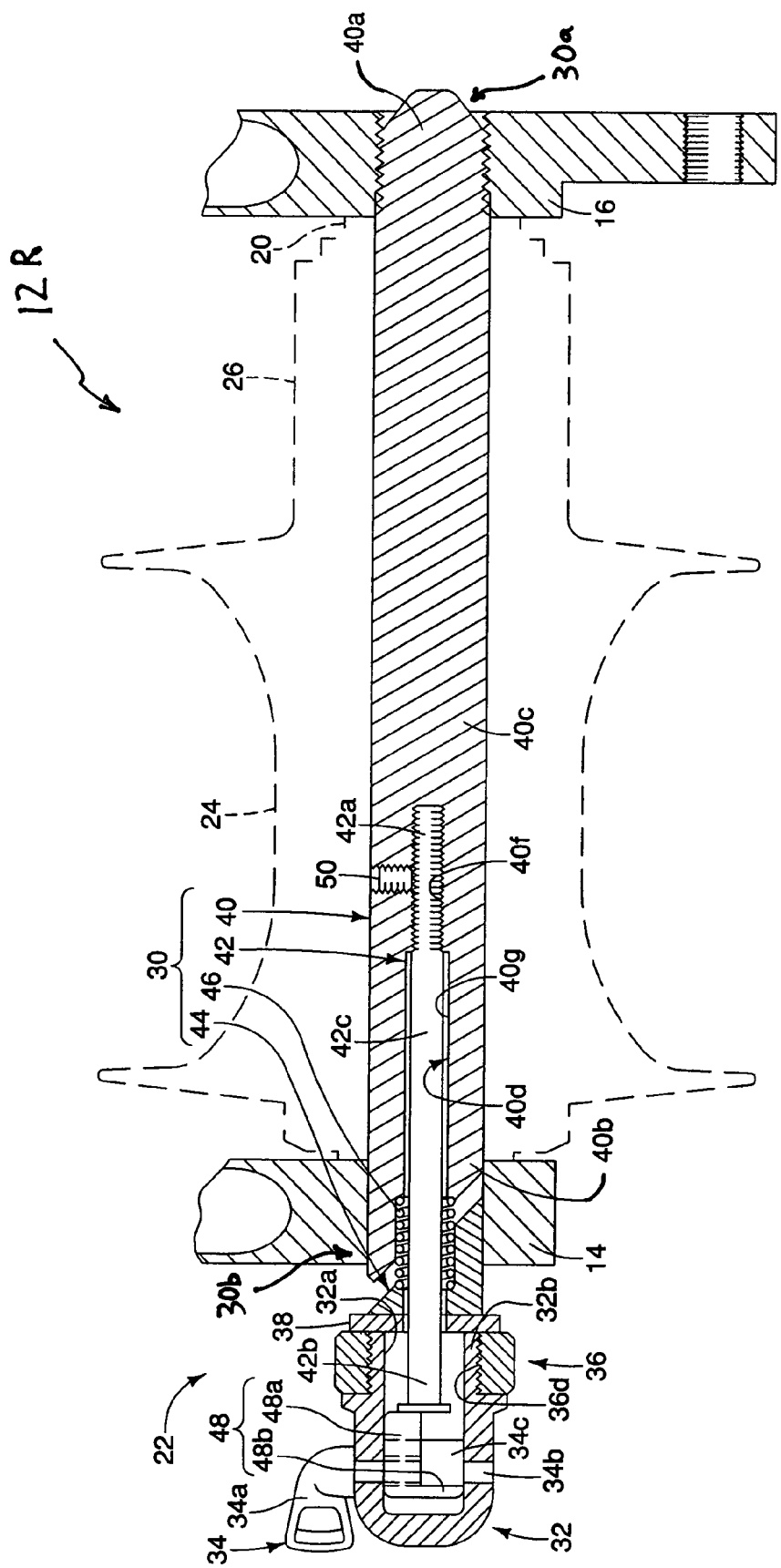
FIG. 6 is an enlarged, partial cross-sectional view of a portion of the frame and the rear hub illustrated in FIGS. 1-2, with the wheel securing axle in a second, partially installed position (i.e. during rotation as illustrated in FIG. 5)

In order to assemble the wheel securing axle 22 as a unit, the wheel securing mechanism (i.e., the head member 32, the lever member 34 and the inner axle 42) is assembled using conventional assembly techniques, as seen in FIGS. 3 and 9. The adjustment member 36 can be threaded onto the head member 32 before or after assembling the wheel securing mechanism (i.e., the head member 32, the lever member 34 and the inner axle 42), as best understood from FIG. 3. The washer 38, the expansion member 44 and the biasing member 46 are mounted on the inner axle 42 after installing the adjustment member 36. The inner axle 42 is inserted into the internal bore 40d and threadedly attached to the outer axle 40 such that axial removal of the inner axle 42 is prevented and such that the washer 38, the expansion member 44 and the biasing member 46 are retained on the inner axle 42, as best understood from FIGS. 3 and 4. Then the set screw 50 is coupled between the outer axle 40 and the inner axle 42 to prevent rotation of the inner axle 42 relative to the outer axle 40, as best understood from FIGS. 3 and 4. Now, the shaft member 30 is fully assembled.

The unit including the main hub axle 20, the hub assembly 24 and the free wheel 26 can now be attached to the mounting flanges 14 and 16 using the wheel securing axle 22. In order to mount the rear hub 12R to the frame 11, the unit including the main hub axle 20, the hub assembly 24 and the free wheel 26 is positioned between the mounting flanges 14 and 16. The wheel securing axle 22 is then inserted through the hole 14a of the mounting flange 14, through the main hub axle 20, the hub assembly 24 and the free wheel 26, and threaded into the threaded hole 16a of the mounting flange 16a, as best understood from FIGS. 4-7. Now, the adjustment member 36 is axially adjusted relative to the head member 32 such that moving the lever member 34 from the release position (FIG. 7) to the fixing position (FIG. 8) tightly clamps the mounting flange 14. Once the desired position of the adjustment member 36 is determined, the tightening element 37 can be tightened.

If the rear wheel needs to be removed, the lever member 34 is moved to the release position, and then the entire wheel securing axle 22 is rotated to detach the shaft 30 from the mounting flange 16. Then the entire wheel securing axle 22 can be axially removed, and the remainder of the rear wheel can be removed from the rear triangle 13 of the bicycle frame 11. The installation procedure above can be repeated to reattach the rear hub 12R to the bicycle frame 11. With the arrangement illustrated herein, the shaft member 30 can be located in the same position relative to the mounting flange 16 (i.e. if fully tightened) every time it is installed. Thus, the arrangement illustrated herein, it is possible to leave the adjustment member 36 in the same position when removing and reinstalling the rear hub 12R. However, as mentioned above, it will be apparent to those skilled in the art from this disclosure that various modifications can be made to the threaded bore 16a and the first threaded end portion 30a as needed and/or desired, without departing from the scope of the present invention.

The threaded connection (the connection between the first threaded end 42a and the threaded section 40f) disposed between the outer axle 40 and the inner axle 42 form part of a fixing structure of the shaft member 30 (disposed between the outer axle 40 and the inner axle 42), which releasably prevents axial removal of the inner axle 42 from the internal bore 40d when the inner axle 42 is in the installed position. The set screw 50 mounted in the transverse threaded hole 40e of the outer axle 40 and the external surface of the inner axle 42 also form part of the fixing structure of the shaft member 30 (disposed between the outer axle 40 and the inner axle 42), which releasably prevents relative rotation of the inner axle 42 within the internal bore 40d when the inner axle 42 is in the installed position.

Figure 16:
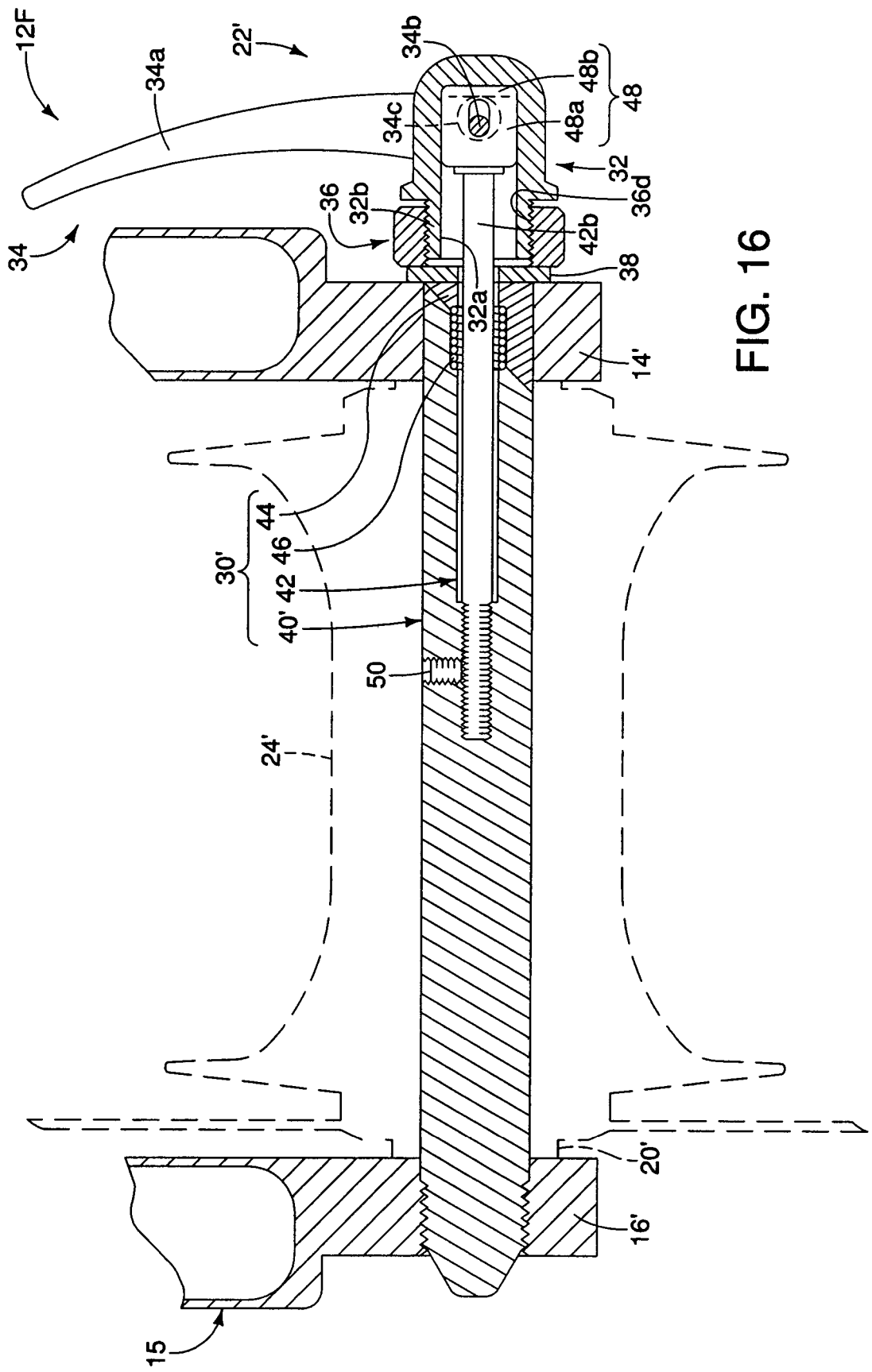
FIG. 16 is an enlarged, partial cross-sectional view of a portion of the frame and the front hub illustrated in FIG. 1, with the wheel securing axle in a fully installed position after clamping the frame using the wheel securing lever.

Referring now to FIGS. 1 and 16, the front hub 12F will now be explained in more detail. The front hub 12F is identical to the rear hub 12R, except the free wheel 26 of the rear hub 12R has been eliminated. Due to the elimination of the free wheel 26, the front hub 12F and some of its parts are narrower than equivalent parts of the rear hub 12R.

The front hub 12F is secured to the frame 11 using a wheel securing axle 22' in a manner identical to the rear hub 12R, as mentioned above. Specifically, the frame 11 includes a front fork 15 with a pair of hub mounting flanges 14' and 16' formed at the free ends thereof. Preferably, one end of the wheel securing axle 22' is directly threadedly attached to the mounting flange 16', while the other end has a wheel securing mechanism that is used to securely attach the wheel securing axle 22' to the other mounting flange 14'. The mounting flanges 14' and 16' are identical to the mounting flanges 14 and 16, respectively, except that the mounting flanges 14' and 16' are closer together due to the narrower configuration of the front hub 12F.

In view of the similarity between the front and rear hubs 12F and 12R and the front and rear mounting flanges 14, 14', 16 and 16', the front hub 12F and the mounting flanges 14' and 16' will not be discussed and/or illustrated in detail herein. However, it will be apparent to those skilled in the bicycle art from this disclosure that the descriptions and illustrations of the rear hub 12R and the rear mounting flanges 14 and 16 also apply to this front hub 12F and the front mounting flanges 14' and 16', respectively, except as explained and/or illustrated herein.

Parts of the front hub 12F that are identical to parts of the rear hub 12R will be identified with same reference characters as the rear hub 12R for the sake of convenience. Parts of the front hub 12F that are functionally identical (but not exactly identical) to parts of the rear hub 12R will be identified with the same reference characters but with a prime(') added thereto for the sake of convenience. Parts of the front hub 12F that are functionally identical to parts of the rear hub 12R are identical to parts of the rear hub 12R, except the parts of the front hub 12F that are functionally identical to parts of the rear hub 12R are longitudinally shorter than the corresponding parts of the rear hub 12R. In other words, the wheel securing axle 22' is identical to the wheel securing axle 22, except that some of the parts of the wheel securing axle 22' are longitudinally shorter (narrower) than corresponding parts of the wheel securing axle 22. Thus, the wheel securing axle 22' of the front hub 12F will not be discussed and/or illustrated in further detail herein.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalent.

What is claimed is:

1. A bicycle wheel securing structure comprising:
a shaft member having a first end portion and a second end portion with a longitudinal center axis extending therebetween;
a head member coupled to the shaft member at the second end portion of the shaft member;
a lever member operatively mounted between the shaft member and the head member to move the shaft member in an axial direction of the shaft member relative to the head member in response to movement of the lever member;
a radial expansion structure disposed at the second end portion of the shaft member, the radial expansion structure including an expansion member and the second end portion of the shaft member, the expansion member having a first inclined surface and the second end portion of the shaft member having a second inclined surface that cooperates with the first inclined surface of the expansion member to radially expand an outer diameter of the radial expansion structure in response to the movement of the lever member from a release position to an attachment position, the first and second inclined surfaces being inclined relative to the longitudinal center axis; and
an adjustment member axially adjustably coupled to the head member to move on the head member in the axial direction of the shaft member with respect to the head member, an axial position of the expansion member of the radial expansion structure being adjusted with respect to the head member in the axial direction of the shaft member in response to an axial adjustment of the adjustment member with respect to the head member, the shaft member moving with respect to the adjustment member in the axial direction of the shaft member in response to the movement of the lever member.

2. The bicycle wheel securing structure according to claim 1, wherein
the head member includes a substantially annular abutment surface projecting radially outwardly of the outer diameter of the radial expansion structure.

3. The bicycle wheel securing structure according to claim 1, wherein
at least a portion of the outer diameter of the radial expansion structure is formed on the expansion member.

4. The bicycle wheel securing structure according to claim 3, wherein
at least a portion of the outer diameter of the radial expansion structure is formed on the second end portion of the shaft member.

5. The bicycle wheel securing structure according to claim 1, wherein
the longitudinal center axis intersects the first and second inclined surfaces.

6. The bicycle wheel securing structure according to claim 1, wherein
the first and second inclined surfaces are substantially planar surfaces.

7. The bicycle wheel securing structure according to claim 1, wherein
the first end portion of the shaft member is externally threaded.

8. The bicycle wheel securing structure according to claim 1, wherein
the radial expansion structure includes a biasing member normally biasing the radial expansion structure toward a non-expanded state.

9. The bicycle wheel securing structure according to claim 1, wherein
the shaft member includes an outer axle having a first axial end and a second axial end with the second inclined surface and an inner axle extending from the second axial end of the outer axle with the head member coupled thereto.

10. The bicycle wheel securing structure according to claim 9, wherein
the expansion member has an annular configuration with the inner axle extending therethough.

11. The bicycle wheel securing structure according to claim 9, wherein
the inner axle is a separate member from the outer axle that is releasably disposed within an internal bore of the outer axle in an installed position.

12. The bicycle wheel securing structure according to claim 11, wherein
the inner axle is threadedly attached within the internal bore.

13. The bicycle wheel securing structure according to claim 11, wherein
the internal bore is a blind bore.

14. The bicycle wheel securing structure according to claim 11, wherein
the shaft member includes a fixing structure disposed between the inner axle and the outer axle to releasably prevent axial removal of the inner axle from the internal bore when the inner axle is in the installed position.

15. The bicycle wheel securing structure according to claim 14, wherein
the fixing structure includes a threaded connection between the outer axle and the inner axle.

16. The bicycle wheel securing structure according to claim 11, wherein
the shaft member includes a fixing structure disposed between the outer axle and the inner axle to releasably prevent relative rotation of the inner axle within the internal bore when the inner axle is in the installed position.

17. The bicycle wheel securing structure according to claim 16, wherein
the fixing structure includes a set screw arranged in a transverse threaded bore of the outer axle, the transverse threaded bore extending between an external surface of the outer axle and the internal bore such that the set screw is releaseably engageable with the inner axle.

18. The bicycle wheel securing structure according to claim 17, wherein
the fixing structure includes a threaded connection between the outer axle and the inner axle.

19. The bicycle wheel securing structure according to claim 16, wherein
the fixing structure includes a threaded connection between the outer axle and the inner axle.

* * * * *